Figure 1:
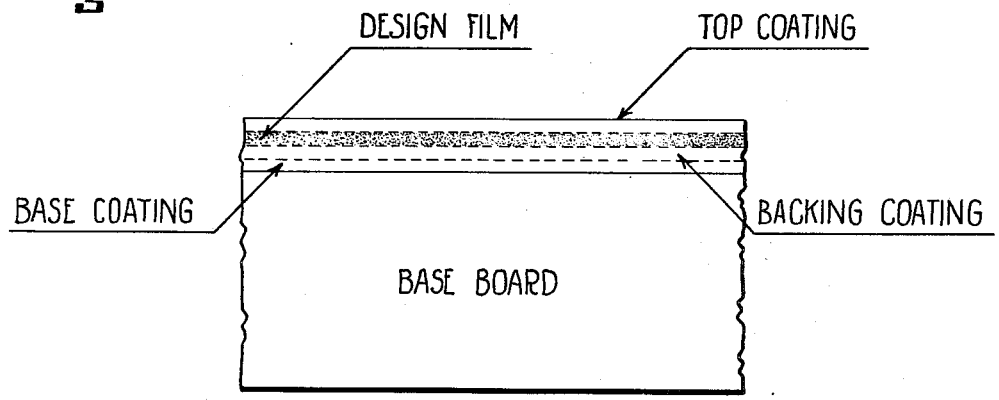

Sept. 24, 1940.  A. B. SAUNDERS  2,215,595

DECORATIVE PANEL AND METHOD FOR MAKING SAME

Filed April 23, 1937

INVENTOR.
Arthur B. Saunders.
BY Virgil C. Kline
ATTORNEY.

Patented Sept. 24, 1940

2,215,595

UNITED STATES PATENT OFFICE 2,215,595

DECORATIVE PANEL AND METHOD FOR MAKING SAME

Arthur B. Saunders, Nashua, N. H., assignor to Johns-Manville Corporation, New York, N. Y., a corporation of New York Application April 23, 1937, Serial No. 138,525

16 Claims. (Cl. 41—33)

The present invention relates to decorative panels of the type commonly employed as wainscoting and for other finishing and ornamental purposes, and a method of preparing the panels.

Decalcomania processes are commonly used to form decorative panels bearing designs in imitation of rare wood, marble, and other expensive finishings. All panels heretofore so made, have been subject to serious objection because of their lack of durability when subjected to numerous conditions normally encountered by decorative finishes.

It is an object of this invention to provide a decorative panel which involves a decalcomania process in its formation, and which is exceedingly durable when exposed to moisture, and which does not undergo undesirable physical or chemical alteration either before or subsequent to incorporation in a structure.

It is a further object of the present invention to provide a panel in which the decorative finish is composed entirely of a truly thermoplastic material, and in which the various coatings and film applied during the formation of the panel can be fused or coalesced into a unitary body.

It is another object of this invention to provide a method of preparing a decorative panel which shall have all of the foregoing desirable characteristics.

Other objects and advantages, if not specifically pointed out, will be apparent to those skilled in the art from the following detailed descriptions of what are now considered to be the preferred embodiments of the present invention.

Figure 2:
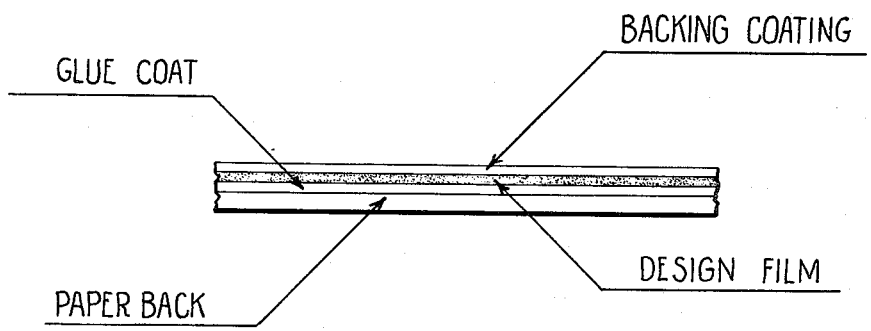

In the drawing:

Fig. 1 is a fragmentary edge view of a decorative panel constructed in accordance with the present invention, and Fig. 2 is a fragmentary edge view of a decalcomania or transfer sheet employed in the preparation of such a decorative panel.

It has been the practice heretofore in preparing decorative panels to apply a lacquer base coating to a suitable base board, such as a composition or wooden board, adhere a design transfer film to the base coating, and apply a protective or top coating of clear lacquer to the film. The lacquer base and top coatings have usually included material such as nitro-cellulose which is not truly thermoplastic, and the decalcomania or transfer films have been formed of inks having a linseed oil or other drying oil base. Decorative panels so formed have been unsatisfactory because of the general lack of durability of the finishes, particularly when exposed to moisture. The finishes have been unstable because it has been impossible during fabrication to secure proper adhesion between the film and the base coat, and between the film and the top coat, due to the fact that the dissimilar materials could not unite, and at best a mechanical bond was all that could be effected. Furthermore, the materials employed in the ink film, and base and top coatings were subject to gradual oxidation and consequent embrittlement, with the result that the finish underwent undesirable changes after it was applied to the base board. These panels have been so seriously affected by moisture and air, that their field of application has been definitely limited.

The present invention enables the foregoing defects to be eliminated by the use of a substance throughout the base coat, transfer film, and top coat, which is truly thermoplastic, does not gradually oxidize, or slowly polymerize, and enables the various coatings and film to be fused or coalesced into a unitary body by the application of heat, and, in some instances, pressure.

It has been found that certain truly thermoplastic vinyl resin compositions may be employed, either as one element or predominantly, in coatings or lacquers and as an ink base for the transfer film, and that materials so formed may be incorporated into a decorative panel having unusual durability and beauty.

Referring to Fig. 1, a base board is shown which may be formed of wood, metal, ceramic tile, or of any of the usual materials employed in the manufacture of composition boards. Such materials are wood fibre, asbestos-cement, ply wood, and other suitable materials. The base board is usually mechanically smoothed and, in some instances, filled with a suitable plastic or liquid and further smoothed to present a surface suitable for the application of a decorative finish.

A base coating is applied to the smooth surface of the board in any suitable way, for example, by brushing, spraying, or rolling. The base coating in the present invention comprises a vinyl resin composition and, in most instances, a suitable pigment. Vinyl resin compositions have a strong tendency to weld or adhere to the base board, even when the same has been impregnated with a suitable waterproofing material.

There are numerous vinyl resin compositions which may be employed for the base coating, design film ink base, and top coating, such as vinyl acetate, vinyl chloride and a mixture of vinyl acetate and vinyl chloride. The co-polymer of vinyl acetate and vinyl chloride is of exceptional value for this purpose. This product is obtained by subjecting a mixture of vinyl acetate and vinyl chloride to polymerization under suitable conditions which are well understood by those skilled in the art and need no further discussion. The proportions of vinyl acetate and vinyl chloride may vary over a considerable range. For example, the vinyl chloride may constitute 60, 70, or even 90% or more of the entire composition. However, a very satisfactory product is obtained by combining 85 to 87% of vinyl chloride with 13 to 15% of vinyl acetate.

The vinyl resin may also be combined with suitable compatible resins, such as phthalate, diamyl phthalate, the ester of the monobutyl ether or ethylene, glycol and phthalic acid, tricresyl phosphate, castor oil, and chlorinated diphenyls known as "Arochlors."

Suitable pigments are added to the vinyl resin composition for the purpose of producing coloration, sufficient porosity to enable the escape of thinners upon the application of heat, and to produce greater stability and thereby permit the use of higher temperatures during formation of the panel.

The material used for the base coating usually contains a pigment, such as titanium dioxide, for the purpose of providing a color background for the later applied design film, as well as for the reasons given above.

The base board carrying the base coating is then subjected to an elevated temperature to evaporate the thinners and flow the base coating evenly over the base board. Since the vinyl composition used for the base coat is truly thermoplastic, even at high temperatures, the minute openings made by the escape of the volatilized thinners immedately close and do not remain in the finished product. This is not true when cellulose lacquers or oil compositions are employed, since the application of heat tends to harden the materials and either prevent the escape of the volatilized thinners, or prevent the material from flowing solid and closing the openings formed by the volatiles which do force their way through the coating.

The coated board is subjected to the elevated temperature, which may be between 300 and 400°, usually around 360° F., for a period of 1 to 1½ hours.

The baked sheet may then have its coated surface further smoothed by abrading or polishing, if extreme smoothness is desired, but in most instances the baked coating will be found to be sufficiently smooth without further treatment to receive the design transfer film.

The design transfer film or decalcomania, shown in Fig. 2, is formed in any suitable manner. Such films are usually prepared by coating a suitable paper backing with a water-soluble glue, such as dextrin or agar-agar, and printing the desired design by rotogravure process upon the glue coating. In the present invention the inks employed for printing the design are formed of vinyl resin compositions, of the type previously described, to produce a transfer film which is truly thermoplastic throughout.

The transfer film may, if desired, be directly applied to the base coating, but it has been found that superior results are obtained if a backing coating, formed of substantially the same material as the base coating, is sprayed or otherwise applied over the face of the transfer film. A "wick action" takes place between the backing coating and the ink film which causes the backing coating and the ink film to be tenaciously interlocked and thereby materially increase the thickness of the transfer film.

The transfer film is then placed with the backing coating in contact with the base coating and heat and pressure applied to the paper backing. The temperature may vary between 200 to 400° F., e. g. 300° F., and the pressure may be in the vicinity of 75 pounds. A period of 2 or 3 minutes is sufficient for the application of the heat and pressure.

The backing paper is then stripped off of the transfer film. This may be done without the application of moisture, but as a surety against tearing of the transfer film, sufficient water is usually applied to the backing sheet to dissolve the water-soluble glue before the backing sheet is stripped off.

The application of heat and pressure to the design transfer film as above, causes the base coatings and the backing coatings, and the backing coating and the film to fuse or coalesce together and thereby provide a perfect bond between these applications.

When cellulose or oil base films and coatings have been used, there has been a tendency for the oil to sweat upon the application of heat and form blisters between the film and the base coating and between the base coating and the base board. The blisters so formed destroy adhesion at their points of formation, and thereby produce an inferior product. This defect is entirely eliminated by the use of truly thermoplastic materials in accordance with the present invention.

If desired, instead of utilizing a decalcomania or design transfer film of the type previously described to produce the desired decorative effect, the design may be applied on the base coating by printing or otherwise forming the design directly thereon.

A top coating containing a vinyl resin composition of the type before described, but usually clear or containing very little colored pigment, is sprayed, or otherwise applied over the exposed face of the decorative film, and the panel is again subjected to an elevated temperature which may be between 200 and 300°, e. g. 275° F., for about ½ hour. This causes the top coating and the design film or other decorative treatment, to coalesce or fuse together.

In Fig. 1, the lines of demarcation between the various coatings and the decorative design film, have been indicated by dotted lines, since there are no definite lines of demarcation between these various applications after they have been subjected to heat, because of the coalescing or fusing action before mentioned. The thickness of the various coatings have been magnified in Fig. 1 for the purpose of illustration.

After cooling, the sheet is buffed and polished to provide a high gloss on the top coating.

If a colored panel instead of a panel including a design in imitation of marble, wood grain, etc., is desired, the design film or other decorative treatment may be omitted, and the top coating applied directly to the base coating and fused or coalesced with the same to produce a unitary, durable coating on the base board.

Application of the transfer films under heat and pressure is not in all instances required. For example, if the decorative board is not likely to be exposed to water, heat and pressure may be omitted during formation of the board, and a small amount of the solvent may be left in the under coating, or a small amount of solvent may be added to the under coating or the transfer at the time of application of the transfer. The transfer film is then placed in contact with the base coating and passed under pressing rollers, or other suitable pressing devices, to produce excellent adhesion between the transfer surface and the base coat. The paper backing may then be stripped away and the transfer film protected by the application of a suitable varnish, without the aid of heat.

Decorative finishes of the type of the present invention are not limited in their application to flat boards or sheets, but may in the same manner as herein described be applied to curved surfaces such as columns, lamp shades, containers, and small molded articles.

The foregoing details have been given for the purpose of description and not limitation, since the invention may take many different forms, and is to be limited only by the scope of the following claims.

What I claim is:

1. The method of preparing a decorative panel comprising applying a base coating containing a vinyl resin, a thinner and pigment to a smooth surface of a base board, baking the coated board to evaporate the thinner and flow the coating smoothly over the face of and adhere the same to the board face, applying a backing coating containing a vinyl resin and pigment to a face of a design forming film containing a vinyl resin, bringing the coating on the film into contact with the base coating, applying heat and pressure to the film to fuse the coatings and the film together, applying a finishing coating containing a vinyl resin over the film, and baking the panel to fuse the finishing coating and film together.

2. The method of preparing a decorative panel comprising successively applying to a baseboard a base coating, a design forming film, and a top coating, all of which contain the co-polymer of vinyl acetate and vinyl chloride, and coalescing adjacent films after each application.

3. The method of preparing a decorative panel comprising applying a base coating containing a vinyl resin, a thinner and pigment to a face of a baseboard, subjecting the coated board to an elevated temperature to evaporate the thinner and flow the coating smoothly over the face of and adhere the same to the board face, spraying a backing coating containing a vinyl resin and pigment over the face of a design forming film containing a vinyl resin and adhered to a paper backing sheet by a water soluble adhesive, bringing the coated face of the film after drying into contact with the base coating, applying heat and pressure to the paper backing to fuse the base and backing coatings together and the film and backing coating together, applying sufficient moisture to the paper backing to dissolve the adhesive, stripping away the paper backing, applying a top coating containing a vinyl resin to the exposed face of the film, and finally subjecting the panel to an elevated temperature to fuse the top coating and film together.

4. A method as defined in claim 3 in which the first mentioned elevated temperature does not exceed 400° F.

5. A method as defined in claim 3 in which the first mentioned elevated temperature exists within the range 300°–400° F.

6. The method of preparing a decorative panel comprising applying a base coating containing a vinyl resin to a face of a baseboard, spraying a vinyl resin composition upon a face of a design forming film containing a vinyl resin and adhered to a paper backing, bringing the coating on the film into contact with the base coating, applying heat and pressure to the paper to fuse the coatings and film together, and stripping away the paper backing.

7. The method of preparing a decorative panel comprising successively applying a base coating, a design forming film provided with a backing coating, and a top coating, all of which contain a vinyl resin, to a baseboard, and subjecting the board to an elevated temperature subsequent to each application to fuse the coatings and film into a unitary body.

8. The method of preparing a decorative panel comprising successively applying a base coating, a design forming film provided with a backing coating, and a top coating, all of which contain the co-polymer of vinyl acetate and vinyl chloride, to a baseboard, and subjecting the board to an elevated temperature subsequent to each application to fuse the coatings and film into a unitary body.

9. The method of preparing a decorative panel comprising successively applying to a base member including an asbestos cement composition, a base coating, a design forming film provided with a backing coating, and a top coating, all of which contain a vinyl resin, and subjecting the panel to an elevated temperature subsequent to each application to fuse the coatings and film into a unitary body.

10. The method of preparing a decorative panel comprising successively applying to a base member including an asbestos cement composition, a base coating, a design forming film and a top coating, all of which predominately include a truly thermoplastic material, and subjecting the panel to an elevated temperature subsequent to each application to fuse the coatings and film into a unitary body.

11. A decorative panel including a baseboard and a finish therefor, the finish comprising an integrated coating comprising a stratum adjacent to the baseboard and adhered thereto containing vinyl resin and a pigment, a design stratum integrally joined to said base stratum containing vinyl resin, and a surface stratum containing vinyl resin integrally joined to the design stratum.

12. A decorative panel including a baseboard and a finish therefor, the finish comprising an integrated coating comprising a stratum adjacent to the baseboard and adhered thereto containing vinyl chloride and a pigment, a design stratum integrally joined to said base stratum containing vinyl chloride, and a surface stratum containing vinyl chloride integrally joined to the design stratum.

13. A decorative panel including a baseboard and a finish therefor, the finish comprising an integrated coating comprising a stratum adjacent to the baseboard and adhered thereto containing vinyl acetate and a pigment, a design stratum integrally joined to said base stratum containing vinyl acetate, and a surface stratum containing vinyl acetate integrally joined to the design stratum.

14. A decorative panel including a baseboard and a finish therefor, the finish comprising an integrated coating comprising a stratum adjacent to the baseboard and adhered thereto containing the co-polymer of vinyl acetate and vinyl chloride and a pigment, a design stratum integrally joined to said base stratum containing the co-polymer of vinyl acetate and vinyl chloride, and a surface stratum containing the co-polymer of vinyl acetate and vinyl chloride integrally joined to the design stratum.

15. A decorative panel including a baseboard embodying an asbestos cement composition, and a finish therefor, the finish comprising an integrated coating comprising a stratum adjacent to the baseboard and adhered thereto containing vinyl resin and a pigment, a design stratum integrally joined to said base stratum containing a vinyl resin, and a surface stratum containing vinyl resin integrally joined to the design stratum.

16. A decorative panel including a base and a finish therefor, the finish comprising an integrated coating comprising a stratum adjacent to the base and adhered thereto containing vinyl resin, a design stratum integrally joined to said first stratum and containing vinyl resin, and a surface stratum containing vinyl resin integrally joined to the design stratum.

ARTHUR B. SAUNDERS.